(12) United States Patent
Perlo et al.

(10) Patent No.: US 6,441,956 B1
(45) Date of Patent: Aug. 27, 2002

(54) OPTICAL ELEMENT DESIGNED TO OPERATE IN TRANSMISSION IN THE INFRARED SPECTRUM, PROVIDED WITH A HIGH-DENSITY-POLYETHYLENE COATING

(75) Inventors: Piero Perlo, Sommariva Bosco; Piermario Repetto, Turin; Vito Lambertini, Giaveno; Sabino Sinesi, Piossasco, all of (IT)

(73) Assignee: C.R.F. Societa Consortile per Azione, Turin (IT)

( * ) Notice: Subject to any disclaimer, the term of this patent is extended or adjusted under 35 U.S.C. 154(b) by 39 days.

(21) Appl. No.: 09/612,247

(22) Filed: Jul. 7, 2000

(30) Foreign Application Priority Data

Jul. 8, 1999 (IT) .......................................... TO99A0594

(51) Int. Cl.$^7$ ............................................... G02B 13/14
(52) U.S. Cl. ....................... 359/355; 359/356; 359/565; 359/581; 359/589
(58) Field of Search ................................. 359/363, 581, 359/356, 580, 586, 589, 355

(56) References Cited

U.S. PATENT DOCUMENTS

| 4,533,593 A | * | 8/1985 | Miyata et al. ............... 359/359 |
| 5,091,730 A | * | 2/1992 | Cardiasmenos et al. ... 244/3.16 |
| 5,151,826 A | * | 9/1992 | Pasco .......................... 359/565 |

* cited by examiner

Primary Examiner—Cassandra Spyrou
Assistant Examiner—Fayez Assaf
(74) Attorney, Agent, or Firm—Sughrue Mion, PLLC

(57) ABSTRACT

High-density polyethylene (HDPE) is used as a coating for optical elements operating in transmission in the infrared spectrum, which are made up of a material other than polyethylene, such as hygroscopic salt, semiconductor materials, fluorides, chalcogenides, silver halides, and others, so as to exploit the optical properties of HDPE, at the same time keeping the thickness reduced.

13 Claims, 2 Drawing Sheets

OPTICAL ELEMENT DESIGNED TO OPERATE IN TRANSMISSION IN THE INFRARED SPECTRUM, PROVIDED WITH A HIGH-DENSITY-POLYETHYLENE COATING

BACKGROUND OF THE INVENTION

The present invention relates to optical elements operating in transmission in the infrared spectrum, and the subject of the invention is the creation of optical elements of this type, the main characteristic of which lies in the fact that they are provided with a high-density-polyethylene coating layer.

High-density polyethylene (HDPE) is a polymeric material which presents high transmittance of infrared radiation (approximately 80% for a thickness of 0.5 mm). The index of refraction is low, namely, approximately 1.5 both in the LWIR range (from 8 to 14 micron) and in the MWIR range (from 3 to 5 micron). It moreover presents high impermeability.

HDPE is therefore suited for the production of optical elements for focusing IR radiation, provided that the thickness of the material is kept small (less than 1 mm). For this reason, HDPE is commonly used for the production of Fresnel lenses or refractive microlenses having a very small diameter (and hence a small depth). It is not, instead, conceivable to produce HDPE refractive lenses of greater thickness on account of absorption.

SUMMARY OF THE INVENTION

As already specified above, the subject of the present invention is represented by the use of HDPE not as a basic material for IR optical elements, but as a coating for IR optical elements made of some other material (for example, hygroscopic salt, semiconductor materials, fluorides, chalcogenides, silver halides, and others), exploiting the unique properties of HDPE, at the same time keeping the thickness reduced.

BRIEF DESCRIPTION OF THE DRAWINGS

Further characteristics and advantages of the present invention will emerge from the ensuing description, with reference to the attached drawings, which are provided purely to furnish non-limiting examples, and in which.

DETAILED DESCRIPTION OF THE EMBODIMENT

One first use of HDPE envisaged by the present invention regards coating of lenses made of a hygroscopic salt, such as NaCl, KBr, or KCl.

Hygroscopic salts are relatively inexpensive, present complete transmission of infrared radiation, and are currently used as transmission windows or beam-splitters in IR spectrometers. The limit of these materials lies in their high hygroscopicity. They are sensitive to variations in temperature and humidity and are somewhat brittle.

Figure 1:
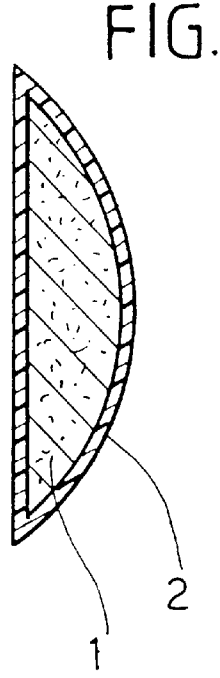
FIG. 1 is a schematic sectional view of an optical element made up of a hygroscopic salt and provided with an HDPE coating according to the invention.

According to the invention (FIG. 1), a lens 1 made of a hygroscopic salt is provided with an HDPE coating 2. This coating, which is plastic and impermeable, makes it possible to render the optical element stronger and, above all, non-hygroscopic. The refractive index of HDPE is very close to that of most hygroscopic salts, and hence the HDPE-salt interface is not optically active, whilst the air-HDPE interface has losses due to reflection of less than 5%. The coating 2 is preferably made on elements with focal power.

A second possible utilization of the coatings according to the invention is the one for anti-reflection (single-layer) coating of materials having a high refractive index, such as ZnS, ZnSe, chalcogenides, silicon, and germanium. All these materials present high refractive indices: ZnS, 2.2; ZnSe, 2.4; chalcogenides, from 2.4 to 2.8; silicon, 3.42; germanium, 4.

Figure 2:
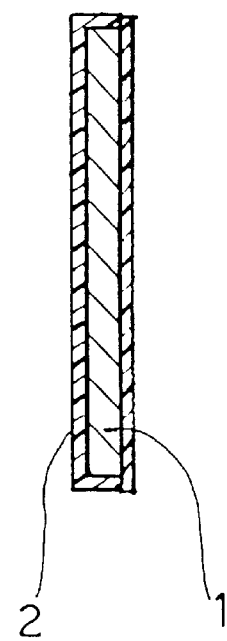
FIGS. 2, 3, and 4 illustrate further variants of the invention.
Figure 5:
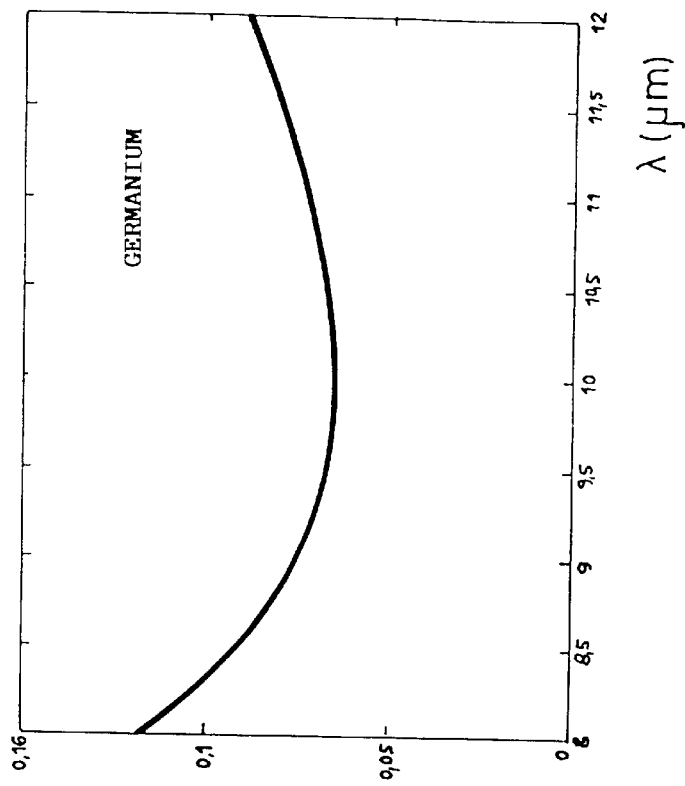
FIGS. 5 and 6 are diagrams illustrating the advantages of the invention.
Figure 6:
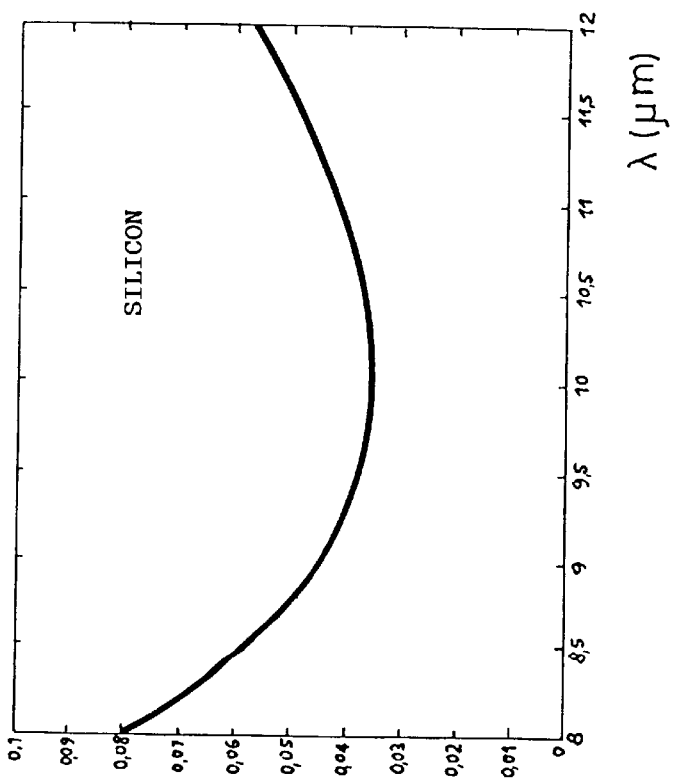

The losses due to reflection at the interface between the air and the material are greater than or equal to 14% for ZnS, 17% for ZnSe, 20% for chalcogenides, 30% for Si, and 36% for Ge. For angles of incidence other than zero, the losses due to reflection are even higher. An HDPE of appropriate thickness (¼ of the wavelength in the medium) naturally serves as an anti-reflection coating. In particular, at a wavelength of 10 micron, a 1.7-micron layer of HDPE reduces reflection of ZnS almost to zero. The effect of an HDPE layer on the reflectance of Ge and Si in the 8 to 12-micron band appears from the diagrams of FIGS. 5 and 6, which show the decrease in reflectance for various wavelengths. An optical element of this type is schematically illustrated in FIG. 2.

A further possible use refers to the application of a multi-layer anti-reflection coating for other types of IR materials. Where it is intended to widen or narrow the transmission window of the optical component, it is in fact possible to devise a multi-layer anti-reflection coating, in which one or more layers are made of HDPE.

Figure 3:
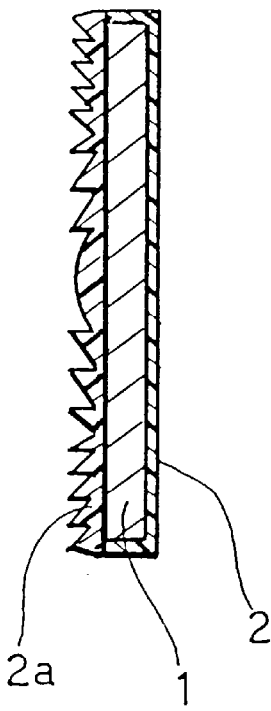
Figure 4:
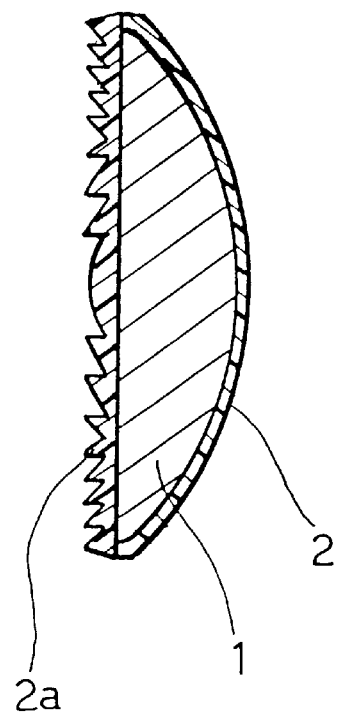

A further use of HDPE according to the invention is as a material for Fresnel optical elements moulded on a rigid IR substrate (with or without focal power). In this case, the Fresnel optical element made of HDPE is moulded on a rigid IR window (either plane—FIG. 3—or curved—FIG. 4), or else on the plane face of a lens made of a material with a high index of refraction. The polyethylene layer on the opposite face of the window or of the lens (which is thinner than the layer with the Fresnel optical element) performs an anti-reflection function, as already described previously. If the Fresnel optical element is moulded on a lens having a high refractive index, the combination of the two elements may serve as a refractive chromatic doublet for correction of dispersion. If the Fresnel optical element is moulded on a lens with a refractive index comparable to that of HDPE, the combination of the two elements may serve as a refractive-diffractive achromatic doublet. In this case, the HDPE lens is diffractive (depth, approximately two MWIR or LWIR wavelengths) and of focal length much greater than that of the refractive lens of high refractive index.

The HDPE layers may be deposited by spinning or by immersion, thus avoiding other, more costly, technologies, such as PVD, CVD, or sputtering.

Of course, without prejudice to the principle of the invention, the details of construction and the embodiments may vary widely with respect to what is described and illustrated herein purely for the purpose of providing examples, without thereby departing from the scope of the present invention.

What is claimed is:

1. An optical element designed to operate in transmission in the IR spectrum, comprising a rigid substrate provided with a coating made of high-density polyethylene (HDPE), wherein the coating consists of a Fresnel optical element which may be either plane without focal power or curved with focal power, and wherein a polyethylene coating on an opposite face of the substrate, which is thinner than the coating consisting the Fresnel optical element, is designed to perform an anti-reflection function.

2. An optical element according to claim 1, wherein the substrate is made up of a hygroscopic salt.

3. An optical element according to claim 2, wherein the refractive index of the HDPE constituting the coating is very close to that of the hygroscopic salt constituting the substrate, in such a way that the HDPE-salt interface is not optically active, while the air-HDPE interface has losses due to reflection of less than 5%.

4. An optical element according to claim 2, wherein the substrate is provided with focal power.

5. An optical element according to claim 2, wherein the substrate is provided without focal power.

6. An optical element according to claim 5, wherein the HDPE layer has a thickness equal to ¼ of the wavelength of the radiation in the medium.

7. An optical element according to claim 1, wherein the substrate is made of a material with a high refractive index, chosen from among ZnS, ZnSe, chalcogenides, silicon, and germanium.

8. An optical element according to claim 7, wherein the substrate is provided with focal power.

9. An optical element according to claim 7, wherein the substrate is provided without focal power.

10. An optical element according to claim 1, further comprising a plurality of anti-reflection layers, one or more of which are made of HDPE.

11. An optical element according to claim 1, wherein the HDPE lens is diffractive.

12. An optical element according to claim 11, wherein the HDPE lens is diffractive and has focal length much greater than that of the refractive lens with a refractive index comparable to that of polyethylene, so as to obtain a refractive-diffractive achromatic doublet.

13. An optical element according to claim 11, wherein the HDPE lens is used with a lens having a high refractive index, so as to obtain a refractive achromatic doublet.

* * * * *